Patented Aug. 15, 1933

1,923,004

UNITED STATES PATENT OFFICE 1,923,004

INSECTICIDE

Wilford Seitz, Sandusky, Ohio, assignor of sixteen and two-thirds to Robert T. Judson, sixteen and two-thirds to Leland P. Spore, and sixteen and two-thirds to Frank B. Cooney, Sandusky, Ohio No Drawing. Application October 23, 1928
Serial No. 314,529

2 Claims. (Cl. 167—34)

My invention relates to insecticides, and particularly to insecticides adapted for spraying plants, trees, flowers, and the like.

It is quite customary to spray plants and bushes with insecticides which are purchased ready-mixed in a concentrated liquid form and then diluted with water containing a solution of soap-suds. There are several outstanding disadvantages in the use of this type of insecticide.

In the first place the liquid must be placed in a proper bottle or container and there is always the possibility that such a bottle or container may be broken while being shpped, the result often being that the entire contents of the bottle are spilled out, even that the insecticide may come in contact with foodstuffs.

Even if the liquid insecticide reaches the user in proper condition, if the user decides to prepare only a quart or so of the insecticide for immediate use it is apparent that only a very small amount of the concentrated liquid insecticide will be required, wherefore in order to obtain the proper strength for the spray solution it is necessary to employ great care in measuring out the proper amount of the concentrated insecticide. The ordinary user is not provided with apparatus for measuring with such care, yet if a spray solution of improper strength is used it will be ineffective to destroy the insects if too weak and likely will injure and possibly destroy the plant if the solution be too strong.

The preparing and maintaining of the soap-suds, essential to the proper and most effective use of this type of solution, requires considerable skill and effort, yet if the user fails to keep the soap-suds fluffy the spray will not properly adhere to the leaves of the plant or bush and the effectiveness of the solution will be materially decreased, since the solution must cover the entire leaf or branch if it is to be of any practical value.

I have discovered that a solid concentrated insecticide in tablet form may be prepared, and that such a solid or tablet insecticide avoids all the disadvantages present in a concentrated liquid insecticide.

I have found it convenient to combine in such a solid concentrated insecticide tablet not only an insecticide compound but also an adhesive element for causing the spray to adhere to the plant, a spreader element to insure a proper spreading over the surface to be treated, a reagent for causing the tablet to dissolve rapidly when immersed in water, and a lubricant effective to lubricate the material and thus decrease the pressure required during formation of the tablet.

For the insecticide compound I may use nicotine sulphate, for the adhesive element and the spreader element I may use yellow dextrine, for the reagent I may use sodium bicarbonate and tartaric acid, and for the lubricant I may use stearic acid. In a tablet to be used to make one gallon of insecticide solution I may incorporate these ingredients in the proportions and quantities:

| | Grains |
|---|---|
| Nicotine sulphate | 20 to 40 |
| Yellow dextrine | 140 to 500 |
| Sodium bicarbonate | 30 to 80 |
| Tartaric acid | 30 to 80 |
| Stearic acid | 5 to 10 |

In preparing the tablet I may first put the yellow dextrine into a dry mixing machine having a sieve mounted on top equipped with brushes to brush the yellow dextrine through the sieve directly into the mixing chamber. The remaining ingredients are then put through the sieve into the mixer, the order in which they are inserted is immaterial. After all the ingredients are in I mix the mixture for forty-five minutes to insure a uniform distribution and I then place the dry mixture into the hopper of a pressing machine and press it into tablets which are in turn subdivided by indentations into smaller tablets, each subdivided tablet having stamped thereon a designation of the quantity of water in which it is to be dissolved. The indentations extend across the width of the large tablet and are of sufficient depth to permit the separate smaller tablets to be broken therefrom with ease.

To prepare say a quart of spray solution the user breaks off and dissolves say one of the small tablets, for two quarts two of the small tablets, and so on, it being readily apparent to one skilled in the art that the tablets may be made in any convenient size and may be marked to be used with any designated amount of water. The ingredients themselves are soluble in the water, or at least those ingredients desired in the solution, the insecticide and the spreader and the adhesive, and the tablet probably would dissolve in time even without anything to accelerate that action, but with my tablet the hydration activates the reagent and there ensues a chemical action which rapidly disintegrates the tablet into particles so small that dissolving is almost instantaneous.

As a satisfactory substitute for nicotine sulphate as an insecticide, I find that I may use suitable proportions of nicotine salicitate, nicotine tartrate, and other dry salts of nicotine, also I may use sodium arsenate, calcium arsenate, lead arsenate, salicylic acid, phenol, Bordeaux mixture, or any suitable soluble salts of copper, such as copper sulphate, copper nitrate, etc. I also find that corn or tapioca or potato dextrine, gumarabic, powdered soap, starch, and dry alkali, in suitable proportions, may be used in place of yellow dextrine as an adhesive and spreader, while ox-gall may be used as a spreader only. Aluminum sulphate, or any solid organic acid such as oxalic acid, may be used in place of the tartaric acid, while boracic acid may be substituted for the stearic acid as a lubricant.

Under these circumstances it will appear that the insecticide compound herein disclosed accomplishes the principal object of my invention. At the same time those skilled in the art will realize that the particular embodiment of my invention herein described embodies advantages and uses other than those particularly pointed out or suggested herein, also that this particular embodiment of my invention may be variously changed and modified without departing from the spirit of my invention or sacrificing the advantages thereof, wherefore it will be understood that the disclosure herein is illustrative only, and that my invention is not limited thereto.

I claim:

1. An insecticide compound, comprising: dried nicotine sulphate, and dried dextrine, said nicotine sulphate and dextrine being mixed in predetermined proportions, wherein the nicotine sulphate in solution with liquid is noxious to insect life and substantially harmless to the subject treated, and the dextrine in solution with the same liquid acts as an adhesive vehicle with respect to said subject for said nicotine sulphate, and also acts as a spreading vehicle with respect to said subject for said nicotine sulphate, said nicotine sulphate and dextrine being combined in a solid tablet soluble in liquid, and a disintegrator for said tablet comprising bicarbonate of soda and tartaric acid incorporated in said tablet in solid form and in proportions for effecting rapid disintegrating of the ingredients of said tablet in the liquid in which the tablet is dissolved.

2. A solid insecticide tablet, adapted to be dissolved in liquid, comprising: dried soluble insecticide, and a dried adhesive substance, said insecticide and said adhesive substance being mixed in predetermined proportions, wherein the insecticide in solution with liquid is noxious to insect life and substantially harmless to the subject treated, and the adhesive substance in solution with the same liquid acts as an adhesive vehicle with respect to said subject for said insecticide, and also acts as a spreading vehicle with respect to said subject for said insecticide; and a disintegrator for said tablet comprising two co-acting chemicals, gas forming when hydrated, incorporated in said tablet in solid form and in proportions for effecting rapid disintegration of the ingredients of said tablet in the liquid in which the tablet is dissolved.

WILFORD SEITZ.